United States Patent [19]

Pratolongo

[11] Patent Number: 5,232,413
[45] Date of Patent: Aug. 3, 1993

[54] DYNAMIC COUPLING DEVICE TO TRANSMIT A ROTATORY MOTION BETWEEN TWO SHAFTS

[75] Inventor: Modesto Pratolongo, Milan, Italy

[73] Assignee: Mercantile Lombard Company Ltd., London, England

[21] Appl. No.: 880,708

[22] Filed: May 8, 1992

[30] Foreign Application Priority Data

Nov. 21, 1989 [GB] United Kingdom ............... 8926324

[51] Int. Cl.$^5$ .............................................. F16H 1/28
[52] U.S. Cl. .................................... 475/175; 475/162; 475/180; 475/298
[58] Field of Search ............... 475/114, 116, 145, 162, 475/168, 169, 175, 180, 296, 298, 299, 300

[56] References Cited

U.S. PATENT DOCUMENTS

| | | | |
|---|---|---|---|
| 3,160,032 | 12/1964 | Black | 475/180 |
| 3,682,020 | 8/1972 | Scheiter | 475/114 |
| 4,520,693 | 6/1985 | Sfredda | 475/162 X |
| 4,762,025 | 8/1988 | Lew | 475/175 |
| 4,922,781 | 5/1990 | Peiji | 475/180 X |
| 5,080,638 | 1/1992 | Osborn | 475/162 X |

Primary Examiner—Richard M. Lorence
Assistant Examiner—Benjamin Levi
Attorney, Agent, or Firm—Darby & Darby

[57] ABSTRACT

The device comprises a driving hub (4, 18) coaxially connected to one shaft (20) and oscillatably engaging a number of planetary gear elements (8, 25) homogeneously distributed around the axis of said hub. The planetary gear elements (8, 25) are engaged between a driven crown wheel (6, 21) which is coaxially fastened to a second shaft (3, 23) and an intermediate crown wheel (7, 24) oscillatably linked to the driven crown wheel (6, 21). The planetary gear elements (8, 25) driven in rotation by the hub (4, 18), are guided by the driven crown wheel (6, 21) and the intermediate crown wheel (7, 24) according to an elliptic path submitting them to a cyclic reciprocating movement relative to the axis of the driving hub (4, 18). An actuator (12, 35) tends to cause the driven crown wheel (6, 21) and intermediate crown wheel (7, 24) to rotate in opposite ways in view of transmitting resultant forces counteracting their being driven by the hub (4, 18) to the planetary gear elements (8, 25).

17 Claims, 7 Drawing Sheets

DYNAMIC COUPLING DEVICE TO TRANSMIT A ROTATORY MOTION BETWEEN TWO SHAFTS

This is a continuation of PCT/GB90/01630, filed Oct. 23, 1990.

BACKGROUND OF THE INVENTION

1. Field of the Invention

The present invention relates to a dynamic coupling device to transmit a rotatory motion between two shafts.

Such a device can be widely used in many fields. It can, for example, be used in place of traditional friction clutches to connect the drive shaft to the transmission shaft in a motor vehicle, or in any situation in which it is necessary to connect the ends of two shafts so as to transmit a torque from one shaft to the other while maintaining the possibility of breaking said connection and restoring it at any moment depending upon requirements.

2. Prior Art

It is known that the most used devices to dynamically connect two rotating shafts can be classified in the following categories:

claw clutches;
friction clutches;
electromagnetic clutches;
hydraulic clutches or couplings.

Claw clutches substantially consist of members carried respectively by the two shafts to be connected, provided with mating projections or claws which can engage into each other so as to be driven in rotation.

Claw clutches can transmit very high torques while maintaining very reduced sizes but, on the other hand, they can get engaged only when the relative speed between the two shafts is very slow, or when one of the parts to be connected has a very reduced moment of inertia with respect to the axis of rotation.

Friction clutches transmit a torque between two shafts by utilizing the friction which develops between the surfaces of two or more elements that are pushed against each other and are integral with either shaft respectively. Unlike claw clutches, friction clutches also allow connection between shafts rotating at different speeds, and therefore they are widely used to achieve the connection between a drive shaft in motion and another shaft which is initially stationary.

Friction clutches however suffer the disadvantage that they lose large amounts of energy during the transitory steps in which the driven shaft increases its rotational speed as far as said speed reaches the same value as that of the drive shaft. Actually during these steps sliding inevitably occurs between the contact surfaces of the elements that are pushed against each other, which sliding causes a dissipation of energy in the form of heat and also causes the contact surfaces to be greatly worn out.

Electromagnetic clutches carry out the transmission of motion from a shaft to another by utilizing the electromagnetic induction which is produced between a cylindrical sleeve fastened to one of the shafts and a coil integral with the other shaft and disposed in coaxial relation within the sleeve.

Also clutches of this type allow connection between a rotating shaft and a shaft which is initially stationary. In addition, by suitably adjusting the intensity of the current passing through the coil it is possible to restrain, depending upon requirements, the maximum torque value which can be transmitted from a shaft to another.

These clutches too however have a drawback, that is the high weight and bulkiness they must possess so as to be able to transmit comparatively high torques. In addition, the operation of the electromagnetic clutch brings about an important waste of electric energy.

In hydraulic clutches or couplings, the movement and torque between the shafts are transmitted by effect of the hydrodynamic actions that are generated between bladed elements respectively integral to the two shafts, and a fluid held in a box containing the bladed elements.

Hydraulic clutches as well allow connection between a drive shaft in motion and a second shaft initially stationary.

The main drawback of this type of clutches is given by the occurrence of an important waste of energy in heat, above all when the relative speeds between the shafts are high as a result of losses by friction due to the molecular cohesion of the fluid.

A further drawback resides in the impossibility of entirely transmitting the movement of the drive shaft to the driven shaft when a resisting moment is applied to the latter.

In addition, hydraulic clutches are very complicated in construction, which involves high costs and they must also have big sizes and an important weight so that they may be able to transmit comparatively high torques.

From the foregoing it will be seen that each of the different types of clutches described above has some peculiar qualities which, depending upon the situation, make its use suitable in place of another type. However each type of clutches has drawbacks as well which must necessarily be accepted.

It is also to be noted that no one of the above described devices is adapted to maintain a low energy consumption when the relative speed between the shafts is high.

SUMMARY OF THE INVENTION

The main object of the present invention is substantially to solve the drawbacks which, at the present state of the art, are encountered by turns with the use of anyone of the different types of clutches, and to provide a device possessing the following peculiar qualities all together:

a reduced weight and bulkiness;
the possibility of transmitting high torque;
the possibility of restraining the torque transmitted between the shafts to a predetermined maximum value;
the possibility of connecting a drive shaft in motion to an initially stationary shaft or at all events of interconnecting two shafts having a high relative speed;
the possibility of thoroughly transmitting the rotatory motion between two shafts;
the absence of important losses of energy, even if the relative speed between the shafts is comparatively high, which does not occur in the known art.

The foregoing and further objects which will become more apparent in the course of the present description are substantially attained by a dynamic coupling device to transmit a rotatory motion between two shafts, comprising: a driving hub coaxially and fixedly connected to one shaft; a driven crown wheel fixedly connected to the other shaft; an intermediate crown wheel connected to the driven crown and capable of swinging about a predetermined axis; a number of planetary gear elements homogeneously distributed around the axis of rotation of the driving hub, driven in rotation by the hub itself and guided, between the intermediate crown wheel and the driven crown wheel, according to a path submitting them to a reciprocating cyclic movement relative to the axis of rotation of the driving hub and to the axis of mutual swinging between the intermediate and driven crown wheels; actuator means for submitting the intermediate and driven crown wheels to couples of forces tending to make them rotate in opposite ways about their axis of mutual swinging and consequently transmitting to the planetary gear elements resultant forces counteracting their being driven by said hub.

BRIEF DESCRIPTION OF THE DRAWINGS

Further features and advantages will best be understood from the detailed description of some preferred embodiments of a dynamic coupling device to transmit the rotatory motion between two shafts in accordance with the present invention. Said description will be given hereinafter by way of non-limiting example only, with reference to the accompanying drawings, in which.

DESCRIPTION OF THE PREFERRED EMBODIMENTS

Figure 1:
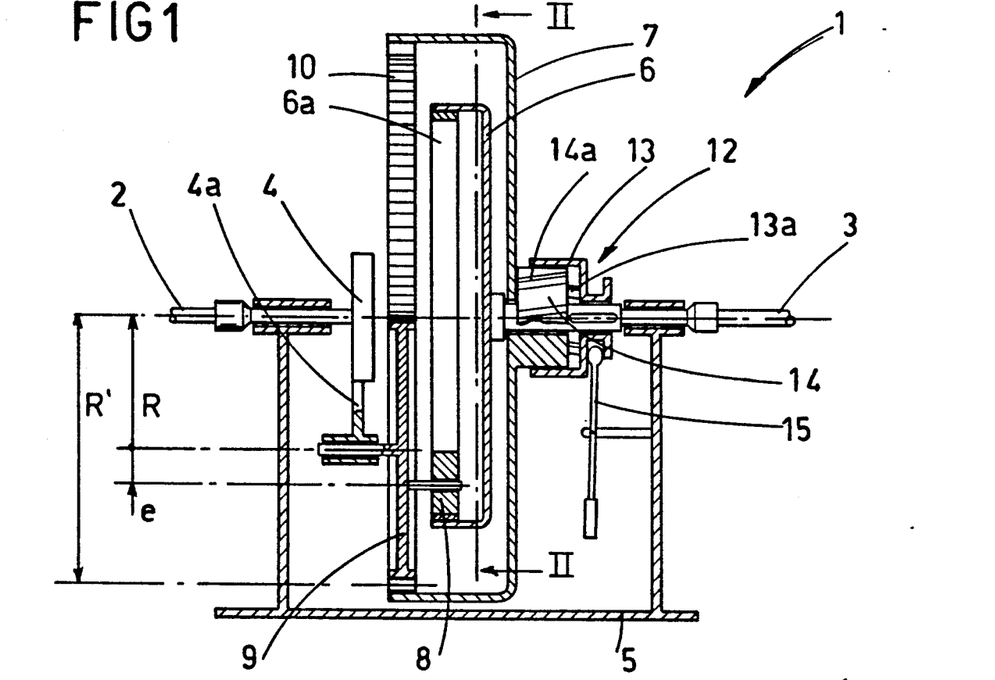
FIG. 1 is a diametrical sectional view diagrammatically showing the main components of the present coupling device according to one embodiment thereof.
Figure 2:
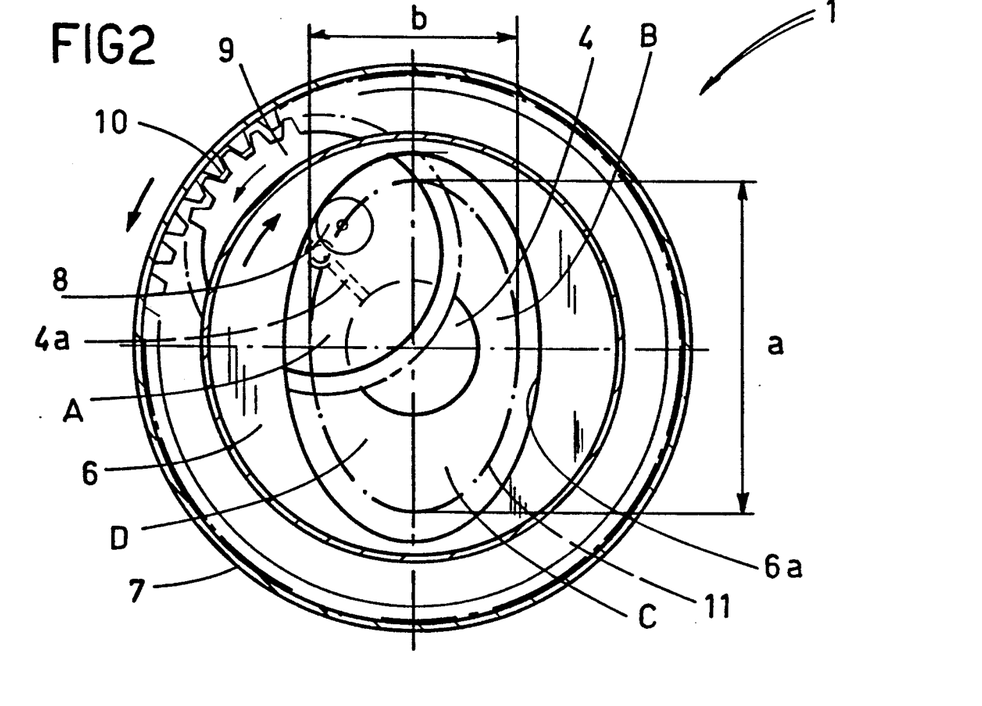
FIG. 2 is a diagrammatic front view of the main components of the device seen in FIG. 1.

Referring particularly to FIGS. 1 and 2, 1 generally denotes a dynamic coupling device to transmit a rotatory motion between two shafts, in accordance with one embodiment of the invention.

The device 1 operates between one shaft 2 and the other shaft 3 which in the example shown are disposed in coaxial relation in order to enable the same to be interconnected so that a rotation and/or a torque can be transmitted from one shaft to the other, while maintaining the possibility of breaking the connection between the shafts and restoring it at any moment depending upon requirements.

To this end, the device 1 substantially comprises a driving hub 4 rotatably supported by a fixed support structure 5 and coaxially engaging the shaft 2 which, by way of example only, will be hereinafter referred to as drive shaft. The other shaft 3 is coaxially connected to a driven crown wheel 6 rotatably carried by the support structure 5 and to which an intermediate crown wheel 7 is fastened. The driven 6 and intermediate 7 crown wheel 7 is fastened. The respect to each other about a predetermined axis which is preferably coincident with the axis of rotation of the driving hub 4.

The device 1 further comprises a number of planetary gear members 8 homogeneously distributed around the axis of rotation of the driving hub 4 and oscillatably engaged to the latter which drives them in rotation. In the diagrammatic views shown in FIGS. 1 and 2, for clarity and simplicity purposes, only one planetary gear element 8 has been shown which is connected to a radial extension 4a of the driving hub 4.

Each planetary gear element 8 is fastened to the driven crown wheel 6 and the intermediate crown wheel 7 so that when it is driven in rotation about the axis of hub 4, it will be forced to take a path (as best shown in the following) which will submit it to a reciprocating cyclic motion relative to the axis of rotation of the hub itself, as well as to the axis of mutual swinging between the crown wheels 6 and 7.

To this end, still referring to the embodiment shown in FIGS. 1 and 2, the planetary gear element is rotatably mounted, in an off-centre position, on a gear wheel 9 rotatably connected to the hub 4 and operatively engaging its toothing 9a with a ring gear 10 formed inside the intermediate crown wheel 7. The driven crown wheel 6 comes into contact on the planetary gear element with a guide surface 6a extending parallelly to the path described by the axis of the planetary gear element itself when the gear wheel is rolling in the ring gear 10. Consequently, the configuration of the guide surface 6a is closely linked to the dimensional ratio between the radius of the gear wheel 9 and the radius of the ring gear 10, identified by "R" and "R'" respectively in FIG. 1, as well as to the amount by which the axis of the planetary gear element 8 is offset with respect to the axis of the gear wheel 9, which amount is referenced by "e" in FIG. 1.

In the example shown in FIGS. 1 and 2, the ratio between the radius R of the gear wheel 9 and the radius R' of the ring gear 10 is equal to 1:2. As a result, the path described by the axis of the planetary gear element 8 is an imaginary ellipse (FIG. 2) in which the difference between the major and minor axes thereof, identified at "a" and "b" respectively in FIG. 2, is four times the distance "e" between the axis of the planetary gear element 8 and the axis of the gear wheel 9.

Figure 8:
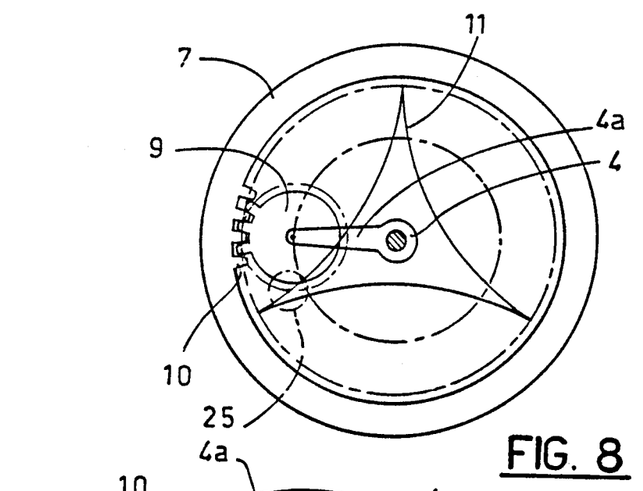
FIG. 8 is a diagrammatic front view of the path taken by the planetary gear element of a device embodied as shown in FIGS. 1 and 2, with a different ratio between the gear wheel carrying the planetary gear element and the ring gear into which the wheel is engaged.
Figure 9:
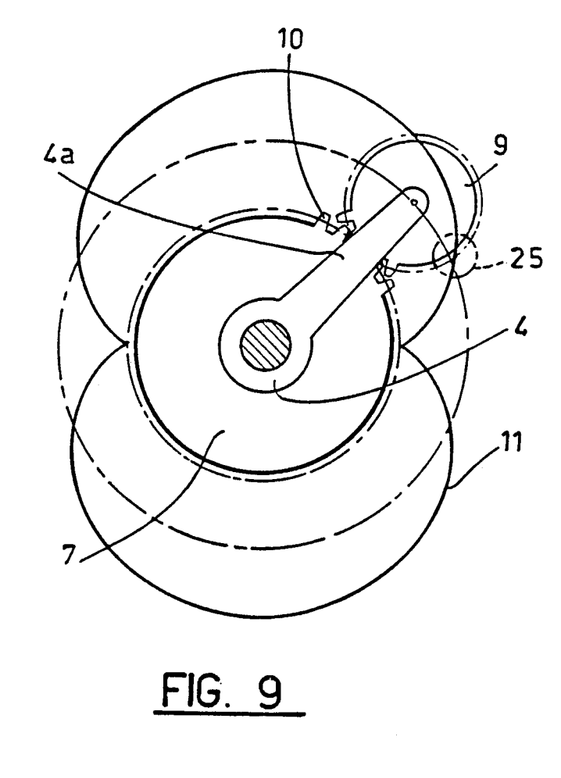
FIG. 9 is a diagrammatic front view of a further embodiment of the main components of the present device as shown in FIGS. 1 and 2, in which the gear wheel is engaged outside the ring gear.
Figure 10:
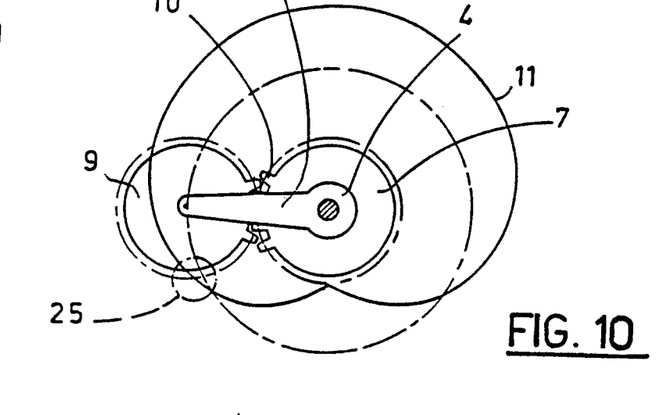
FIG. 10 is a diagrammatic front view of another embodiment in which the gear wheel externally engages a ring gear of same diameter.

Shown in FIGS. 8, 9 and 10 are the paths taken by the axis of the planetary gear element when the gear wheel 9 and ring gear 10 have dimensional ratios and mutual arrangements differing from those shown in FIGS. 1 and 2. In greater detail, FIG. 8 shows the path taken by the axis of a planetary gear element located at the peripheral end of a gear wheel 9 rolling inside a ring gear 10 of radius equal to three times the radius of the gear wheel itself. The described path has a substantially triangular configuration with arched sides. FIG. 9 shows the path described by the axis of a planetary gear element mounted to the periphery of a gear wheel 9 rolling on the outer periphery of a ring gear 10 the radius of which is twice that of the gear wheel itself. The described path has a double configuration that is in the form of a double epicycloid disposed symmetrically to the ring gear 10.

The path shown in FIG. 10 is instead the one described by the axis of a planetary gear element mounted to the periphery of a gear wheel 9 rolling on the outer circumference of a ring gear 10 of the same radius as the gear wheel itself. The described path has a substantially cardioid configuration.

It can be easily assumed from the foregoing that the gear wheel 9 has preferably a diameter which is a submultiple of the diameter of the ring gear and that the path taken by the planetary gear element will be shaped according to a number of portions of a shortened or lengthened normal cycloid which number will be equal to the ratio between the diameters of the ring gear and gear wheel.

The device also comprises actuator means generally identified by reference numeral 12 in FIG. 1, which means submits the driven crown wheel 6 and intermediate crown wheel 7 to couples of forces tending to cause their rotation in opposite ways about their axis of mutual swinging in order to transmitt to the planetary gear elements 8 as a result, resultant forces counteracting their being driven by hub 4. To this end, the actuator means 12 comprises a collar 13 connected in coaxial relation to the driven crown wheel 6 and capable of axially sliding relative to the latter. Provided at the inside of said collar 13 is one helical toothing 13a operatively engaged with a second helical toothing 14a carried by an annular block 14 integral with the intermediate crown wheel and rotatably engaged with respect to the driven crown wheel. Due to the engagement between the collar 13 and annular block 14, the driven 6 and intermediate 7 crown wheels tend to rotate in opposite ways when said collar tends to be axially moved relative to the crown wheels themselves, for example by means of a linkage 15 fitted on the support structure 5.

Operation of the device according to the embodiment shown in FIGS. 1 and 2 and described above mainly as regards structure, is as follows.

The coupling between the gear wheel 9 and ring gear 10 behaves like a conventional coupling of the epicyclic type commonly used for example in accomplishing epicyclic differentials: the gear wheel 9 driven in rotation about the axis of the hub 4, by effect of the rotatory motion imparted to the hub itself by shaft 2, and as it is in engagement with the ring gear 10, is also forced to rotate about its own geometrical axis in an opposite way relative to the driving hub 4.

The planetary gear element which is submitted to rotation about the axis of the gear wheel 9, moves about the axis of the driving hub 4 thus performing an elliptic path and being always in a contact relationship with the guide surface of the driven crown wheel 6.

Taking into account the above explanation it appears that from a kinematic and operating point of view the coupling between the planetary gear element 8 and the elliptic guide surface 6a exactly corresponds to the coupling between the gear wheel 9 and the ring gear 10.

As far as the actuator means 12 is kept in an inactive condition, the drive shaft 2 is disjoined from the driven shaft 3. Actually, under this situation the rotation of the gear wheel within the ring gear 10 and the simultaneous movement of the planetary gear element 8 inside the driven crown wheel 6 takes place freely without any remarkable driving effect being produced on the crown wheels themselves and consequently the driven shaft 3. Upon activation of the actuator means 12, the transmission of the rotation and/or torque occurs instead from the drive shaft 2 to the driven shaft 3.

As a matter of fact, when collar 13 is pushed close to or apart from the crown wheels 6 and 7, the latter tend to rotate in opposite ways, but they are prevented from carrying out any mutual displacement. Actually, if for example the intermediate crown wheel 7 tends to rotate counterclockwise, it transmits a counterclockwise torque to the gear wheel 9, which torque is counteracted by the action of the driven crown wheel 6 on the planetary gear element 8. In fact the crown wheel 6 tends to rotate clockwise and acts against the planetary gear element 8 which tends to be driven by the counterclockwise rotation of the gear wheel 9. It will be appreciated that the couples of forces produced by the crown wheels 6 and 7 on the planetary gear element 8 and gear wheel 9 respectively are generated as a reaction of one couple to the other and they appear therefore perfectly balanced.

Taking now into account the rotatory motion transmitted by the driving hub 4 to the gear wheel 9, one can note that the planetary gear element 8 is subjected to run along the guide surface 6a and encounter areas in which, as it occurs in the condition shown in FIG. 2, the guide surface is pushed towards the planetary gear element due to a tendency to rotation imparted to the driven crown wheel 6. These areas, identified by quadrants A and C in FIG. 2, are disposed in alternate relation with other areas referenced by B and D, in which the guide surface 6a tends to move away from the planetary gear element 8.

When the planetary gear element 8 passes through one of the areas A and C, the force it receives from the guide surface 6a gives rise to a torque on the gear wheel 9 which counteracts its rotation in a counterclockwise direction, this being necessary in order to enable it to be taken in the rotational movement of the driving hub 4. In other words, a resultant force is produced on the planetary gear element 8 which counteracts its being driven in rotation by the hub 4. Therefore, a reaction torque is generated on the driven crown wheel 6 which makes it rotate clockwise together with the intermediate crown wheel 7 and the driven shaft 3, that is according to the same direction of rotation as the drive shaft 2.

It is apparent that with the use of a single planetary gear element 8 as diagrammatically shown in FIGS. 1 and 2, the transmission of the rotatory motion and the torque from the drive shaft 2 to the driven shaft 3 could not take place in a continuous and homogeneous manner. This is due to the alternating of said guide surface areas 6a in a contact relationship with the planetary gear element 8 and defined by quadrants A, B, C and D. This problem is solved by adopting a number of planetary gear elements 8 homogeneously distributed about the axis of the driving hub 4.

Figure 3:
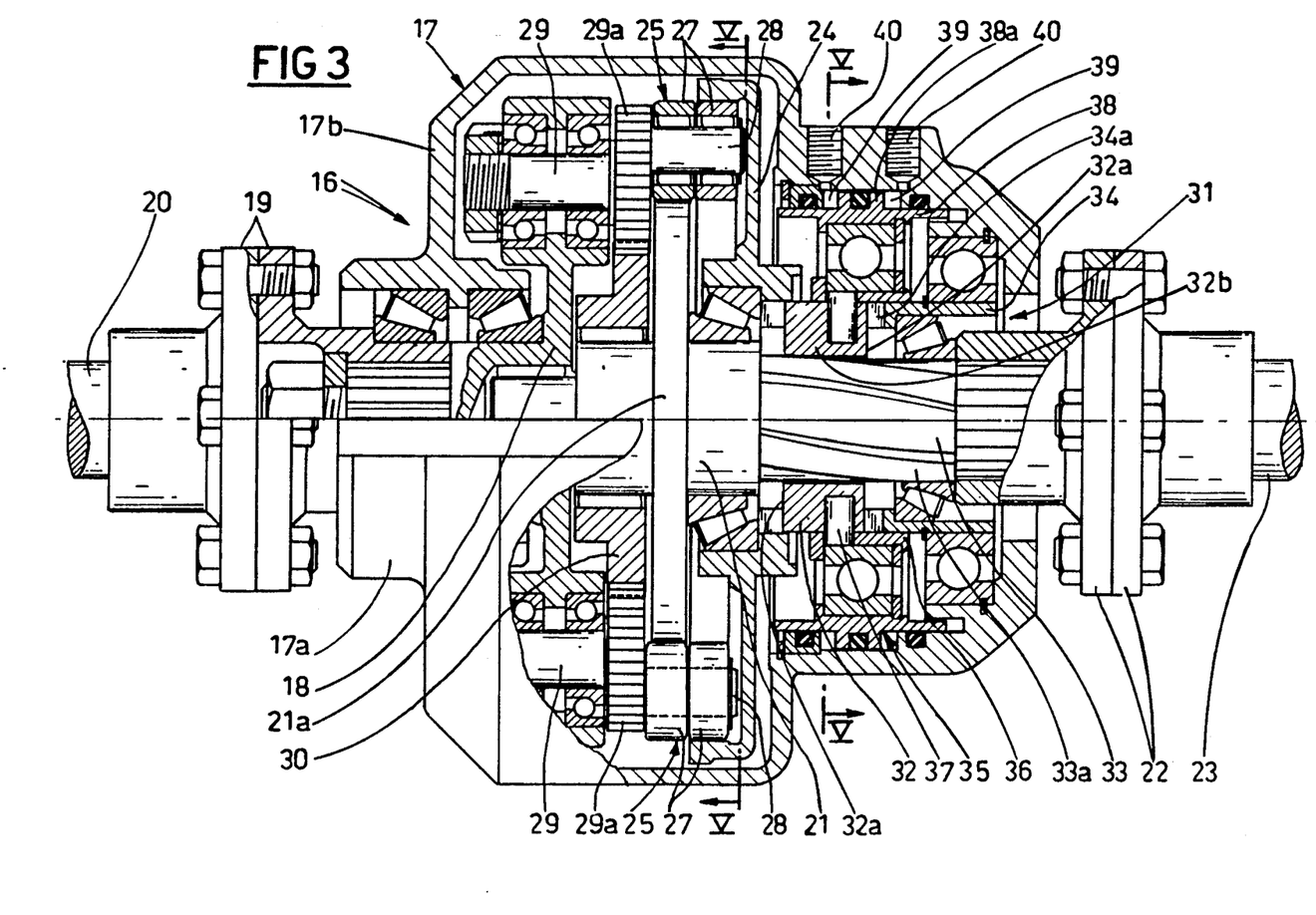
FIG. 3 is a fragmentary diametrical sectional view showing a second embodiment of the coupling device of the invention, in which there is a development of the principles of construction and operation disclosed in the preceding figures.
Figure 4:
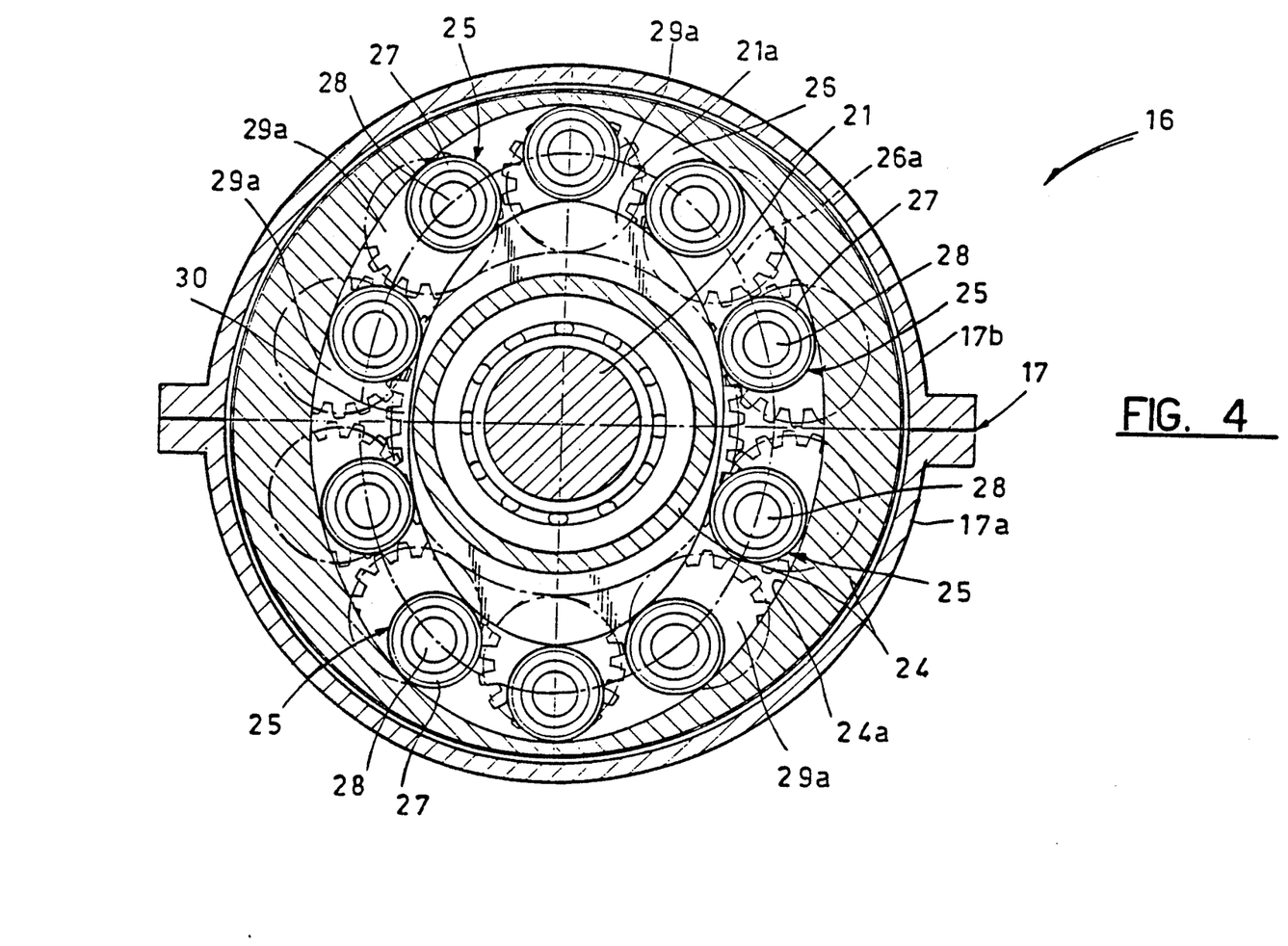
FIG. 4 is a fragmentary sectional view of the present device taken along line IV—IV in FIG. 3.
Figure 5:
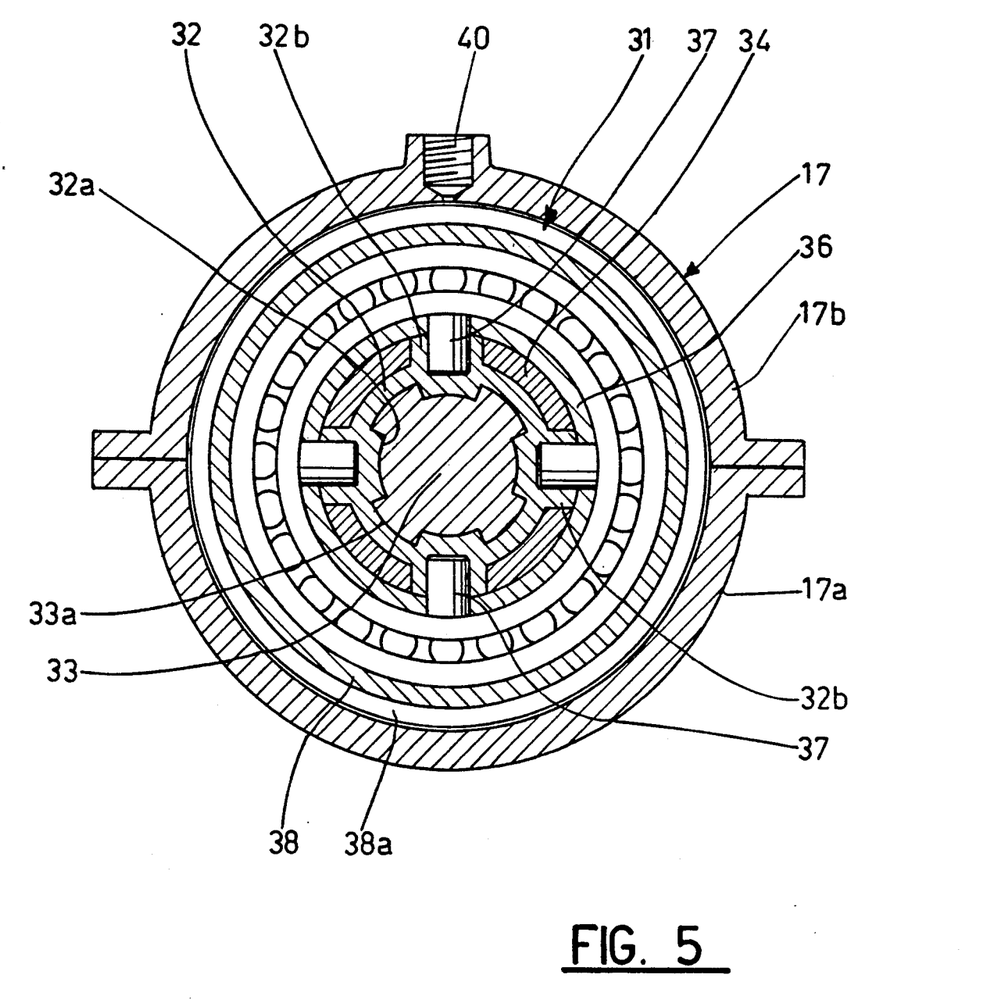
FIG. 5 is a sectional view taken along line V—V in FIG. 3.

Shown in FIGS. 3, 4 and 5 is a further embodiment of the device of the invention generally referenced by 16. This embodiment represents a development of the operating concept of the above described device starting from the presupposition that the coupling between the gear wheel 9 and ring gear 10 can be replaced by a dynamic coupling which is equivalent from an operating standpoint and which is achieved in the same manner as referred to in connection with the coupling between the planetary gear element 8 and guide surface 6a. In greater detail, in the example shown the gear wheel 9-ring gear 10 coupling will be replaced by a substantially elliptic second guide surface offered by the intermediate crown wheel, extending parallelly to the driven crown wheel guide surface and acting on the planetary gear elements on their side opposite that facing the crown wheel.

The foregoing being stated, we point out that the device 16 comprises a support and holding structure 17 preferably consisting of two half-shells 17a, 17b, which can be fixedly engaged to any fixed structure and rotatably houses a driving hub 18 which through first coupling flanges 19 is coaxially connected to one shaft 20 which, by way of example, will be considered as a drive shaft.

Rotatably engaged in the holding structure 17, coaxially with the driving hub 18 is a driven crown wheel 21 which, through second flanges 22, is coaxially connected to the other shaft 23. An intermediate crown wheel generally identified by 24 is fastened to the driven crown wheel 21 in such a manner that it can swing about a predetermined axis preferably coincident with the axis of rotation of the driving hub 18.

The device 16 further comprises a number of planetary gear elements 25 which are homogeneously distributed about the axis of rotation of the driving hub 18 and driven in rotation by the latter. Said planetary gear elements 25 are also guided between the intermediate crown wheel 24 and the driven crown wheel 21 according to a path submitting them to a cyclic reciprocating motion relative to the axis of rotation of the driving hub 18 and the axis of mutual swinging between said intermediate and driven crown wheels.

In greater detail, as clearly shown in FIG. 4, the planetary gear elements 25 are slidably guided along a substantially elliptic slide track 26 lying in a plane at right angles to the axis of the driving hub 18. The slide track 26 is defined between a substantially elliptic guide ring 21a belonging to the driven crown wheel 21 and a substantially elliptic guide cavity 24a belonging to the intermediate crown wheel 24. The guide ring 21a and guide cavity 24a extend parallelly to, and at the same distance from an imaginary ellipse 26a defined by the centre line of the elliptic track 26.

In order to avoid sliding frictions between the planetary gear elements 25 and the driven and intermediate crown wheels 21 and 24, provision is made, as clearly shown in FIG. 3, for two rollers 27 which in operation are in contact with the guide ring 21a and guide cavity 24a respectively and which are rotatably supported by a pivot 28 oscillatably fastened to the driving hub 18 and extending according to an axis parallel to the axis of said driving hub.

Figure 6:
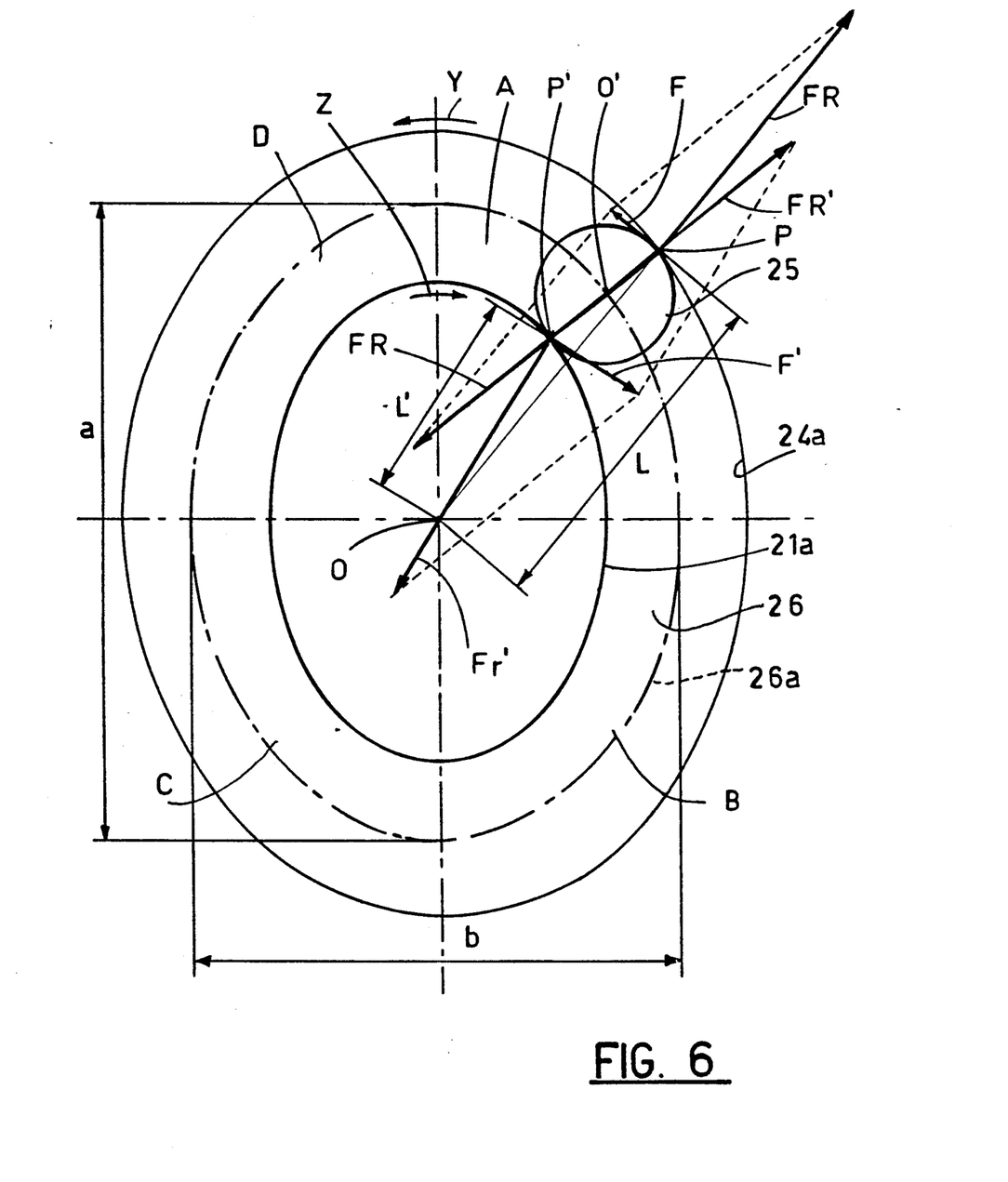
FIG. 6 graphically shows the interacting forces between the intermediate crown wheel, one of the planetary gear elements and the driven crown wheel, due to the operation of the actuator means.

In greater detail, it is preferred that each pivot 28 be eccentrically fixed to a support stem 29 rotatably engaged with the driving hub 18. The support stem 29 extends according to an axis spaced apart from the axis of the driving hub 18 by an amount equal to one fourth of the sum of the major axis "a" and minor axis "b" (FIGS. 6 and 7) in an imaginary ellipse 26a defined by the centre line of the slide track 26. Pivot 28 is offset relative to the support stem 29 by an amount equal to one fourth of the difference between the major axis "a" and minor axis "b" of the imaginary ellipse 26a. These geometric parameters ensure that each planetary gear element 25 will have the possibility of freely travelling along the slide track 26 while rotating about the axis of the driving hub 4 and at the same time about the axis of the corresponding support stem 29 so as to modify at any moment its distance from the axis of rotation of the driving hub. In the example shown where the slide track 26 is substantially elliptic, each roller 25 is subject to exactly perform one revolution about the axis of the support stem 29 by each revolution carried out about the axis of the driving hub 4.

It will be recognized that the connection between the planetary gear elements 25 and driving hub 4 can also take place by slidably engaging each of said pivots 28 along a radial hollow formed in the driving hub 4. In this case the planetary gear elements would have the possibility of modifying their distance from the driving hub centre while running along the slide track 26 but undesired effects could however take place as a result of the forces of inertia generated by the reciprocating movement of the planetary gear elements relative to the axis of the driving hub 18.

In order to optimize the balancing of the centrifugal forces and the transmission of movement from the drive shaft 20 to the driven one 23, preferably the planetary gear elements 25 are provided in an even number being the multiple of an odd number. In the example shown there are ten planetary gear elements 25.

In addition, in view of ensuring a predetermined direction of rotation of each planetary gear element 25 about the axis of the corresponding support stem 29, that is in the opposite way as compared with the rotation of the driving hub 18, the support stems 29 of each planetary gear element 25 must be made coaxially integral with respective sprockets 29a operatively engaging an adjusting collar 30 which is coaxially and rotatably fastened to the driving hub 18.

The device 16 further comprises actuator means 31 designed to submit the driven crown wheel 21 and intermediate crown wheel 24 to a couple of forces tending to make them rotate in opposite ways about their axis of mutual swinging, so as to consequently transmit to the planetary gear elements 25 resultant forces counteracting their being driven by hub 18.

The actuator means 31 comprises an operating collar 32 coaxially located between a connecting shank 33 coaxially extending from the driven crown wheel 21 and a connecting sleeve 34 coaxially projecting from the intermediate crown wheel 24. The operating collar 32 is internally provided with a number of helical teeth 32a operatively engaging with helical teeth 33a offered by the connecting shank 33 of the driven crown wheel 21. In addition, said operating collar 32 is externally provided with a number of radial projections 32b slidably engaging into respective grooves 34a axially formed in the connecting sleeve 34. The operating collar 32 is axially movable relative to the connecting shank 33 and the connecting sleeve 34 upon command of a fluid-operated actuator 35 comprising one annular element 36 fixedly fastened to the operating collar 32 by a number of gudgeons 37, and a second annular element 38 rotatably engaged to the first annular element 36. The second annular element 38 is sealingly and slidably engaged in the holding structure 17 and is externally provided with at least a diametrical relief 38a which is sealingly engaged in an annular chamber 39 formed in the holding structure itself. Opening into the annular chamber 39 are two feed nozzles 40 which come from opposite sides relative to the diametrical relief 38a. Through said feed nozzles a working fluid, for example oil under pressure, is selectively sent to said annular chamber 39.

Operation of the device of the invention according to the embodiment shown in FIGS. 3 to 7 and described above mainly as regards structure, is as follows.

When the fluid-operated actuator 35 is deactivated, shafts 20 and 23 are disengaged from each other. In fact, if under this condition the driving hub 18 is supposed to be driven in rotation clockwise by the first shaft 20 the planetary gear elements 25 carried by said hub will be free to travel along the slide track 26 while rotating counterclockwise about the axes of the respective support stems 29. Under this situation no important driving effect is produced either on the driven crown wheel 21 or on the intermediate crown wheel 24.

By activating the fluid-operated actuator 35 a dynamic connection can be established between shafts 20 and 23, so that a rotatory motion and/or a torque can be transmitted therebetween. Operation of actuator 35 takes place when oil under pressure or another working fluid is sent through one of the feed nozzles 40, which causes a tendency of the intermediate crown wheel 24 to rotate in a way opposite that of the driving hub 18, due to the axial displacement of the operating collar 32 together with the annular elements 36 and 38. In the example diagrammatically shown in FIGS. 6 and 7, where the driving hub 18 rotates clockwise as shown by arrow "X" in FIG. 7, it is provided that the working fluid be sent through the feed nozzle 40 located to the left of the annular shoulder 38a with reference to FIG. 3 so that the operating collar 32 will tend to move apart from the driven 21 and intermediate 24 crown wheels. In this manner the driven crown wheel 21 will tend to rotate clockwise, as shown by arrow "Z" in FIGS. 4 and 5, whereas the intermediate crown wheel 24 as a reaction will tend to rotate counterclockwise, as shown by arrow "Y".

Similarly to the description made with reference to the embodiment shown in FIGS. 1 and 2, under this situation the slide track 26 can be virtually divided into four quadrants A, B, C and D, having the same width (FIGS. 6 and 7) and defined by the axes of symmetry of the slide track itself. In two of said quadrants disposed opposite each other, that is quadrants A and C, the surfaces of the guide ring 21a and guide cavity 24a tend to move close to each other. In the two other quadrants B and D, on the contrary, said surfaces tend to move away from each other.

As a result, each of the planetary gear elements 25, while moving along the slide track 26, is designed to alternately cross areas corresponding to quadrants A and C in which each planetary gear element must counteract the tendency to move closer proper to the surfaces of the guide crown 21a and guide cavity 24a. This situation is clearly shown in FIG. 6 where forces transmitted between the driven crown wheel 21, one of the planetary gear elements 25 and the intermediate crown wheel 24 have been graphically represented. For the sake of clarity, in said graphic representation forces transmitted to the planetary gear element 25 by the driving hub 18 have been omitted.

As viewed in said figure, under the above described situation the planetary gear member 25 is submitted to a counterclockwise force F applied to its tangent point P with the guide cavity 24a, as well as to a clockwise force F' applied to the tangent point P' with the guide ring 21a. It is to note that points P and P' are diametrically opposed as they represent the tangent points of a circle with two parallel lines. Due to the fact that forces F and F' are generated as a reaction of one force to the other, it results that, in order to create a balance, they produce the same torques with respect to the axis of rotation of the system, represented by point O in FIG. 4. As points P and P' to which forces F and F' are applied have different distances L, L' from point O, forces F and F' will have different intensities in order to satisfy the equality:

$$F \cdot M = F' \cdot L'.$$

Through the above equality it is therefore possible to calculate the amount of each individual force F and F', by dividing the value of the torque applied through the actuator 35 by distances L and L', which value must be equal to at least twice the torque transmitted by the drive shaft 20.

Each of said forces F and F' is resolved in a direction passing by point O and a direction normal to the surface of the planetary gear element 25 at the contact point P, P'. Therefore each force F, F' gives rise to a radial component Fr, Fr' directed towards point O which does not produce any rotational effect and to a resultant force FR, FR' passing by points P, P' and the centre O' of the planetary gear element 25.

As easily viewed in FIG. 4, the resultant forces FR, FR' have the same intensity and direction but they are oriented in opposite ways. (For the sake of clarity the resultant forces FR, FR' are shown slightly offset).

As a result, the torques they produce relative to point O, which are equal but opposite, are mutually annulled. It is therefore proved that in the absence of a motive power applied through the driving hub 18 the system of forces produced by the activation of the fluid-operated actuator 35 is perfectly balanced.

Figure 7:
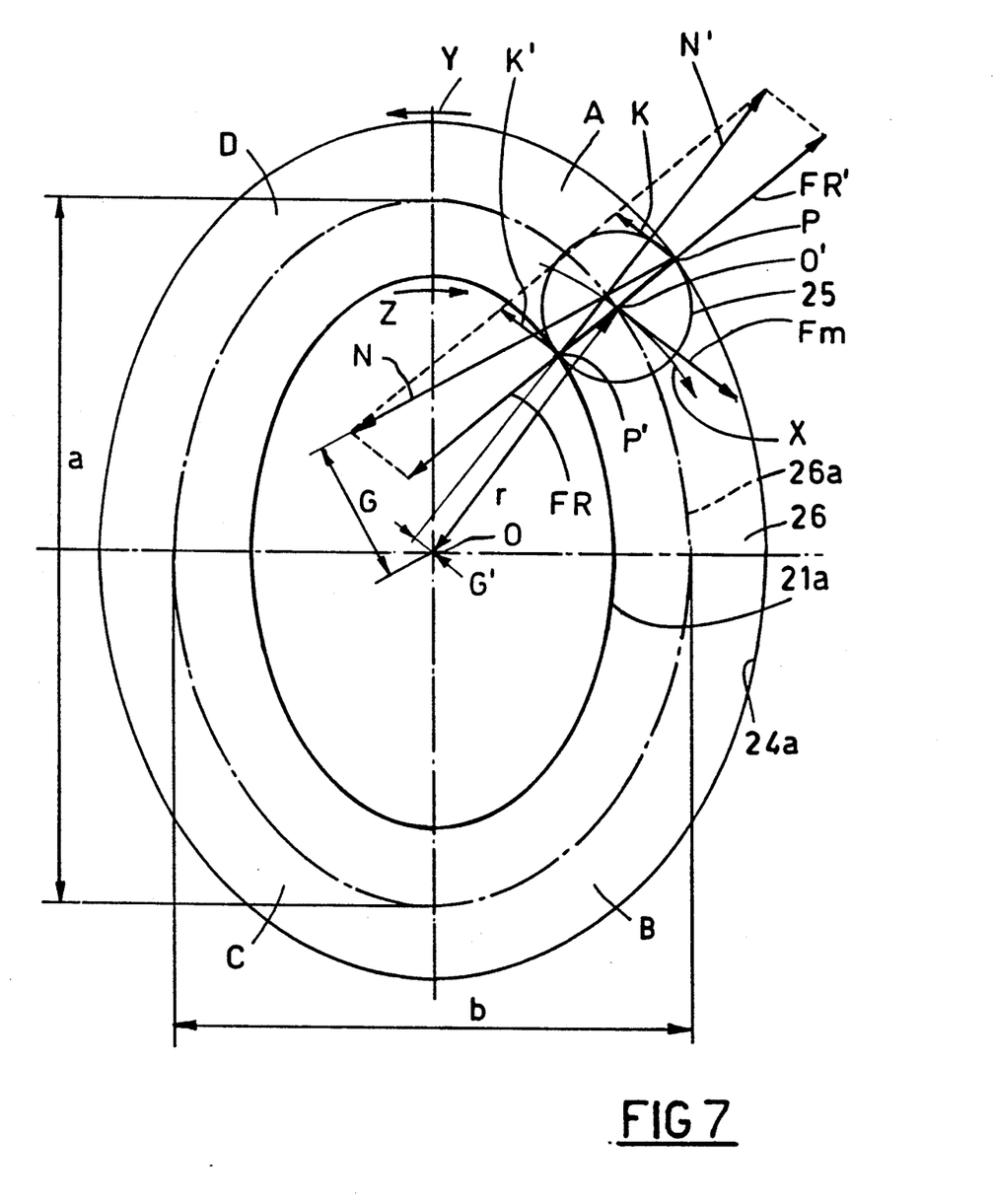
FIG. 7 graphically shows the interaction between the resultant forces in FIG. 6 and the motive power transmitted to the planetary gear element by the driving hub.

Graphically shown in FIG. 7 is the effect which is achieved when the planetary gear element 25 besides being submitted to the application of the above described resultant forces FR, FR', is also submitted to a motive power Fm by means of the driving hub 18. The motive power Fm is considered to be applied to the centre of rotation O' of the planetary gear element 25 and oriented tangentially to a circumference having its centre at O and a radius r equal to the distance between points O and O'. Therefore force Fm produces a torque equal to FR·r relative to point O.

Each resultant force FR and FR' interacts with half the motive power Fm, more specifically with two reaction forces K, K' applied to the planetary gear element 25 by effect of said force Fm. Such reaction forces applied to points P and P' respectively, have parallel directions and opposite ways relative to the motive power Fm and their value is equal to Fm/2.

The composition between the resultant forces FR, FR' and the respective reactions K and K' applied to P and P' gives rise to two final forces N, N' directed towards opposite directions and obliquely oriented relative to each other. In greater detail, as can be seen in FIG. 7, force N applied to point P produces, relative to point O, a torque counteracting the rotation of the planetary gear element 25 by a value equal to N·G, where G is the distance of N direction from point O.

Force N' gives rise, still referring to point O, to a torque concordant with the sense of rotation of the planetary gear element 25 and of a value equal to N'·G', where G' is the measured distance between N' direction and point O.

As graphically viewed in FIG. 5, the torque produced by force N is higher than that generated by N'. More particularly, the difference between the torques produced by final forces N and N' gives rise to a torque equal in intensity to the torque produced by the motive power Fm but directed in the opposite way relative to the latter. The planetary gear element 25 is therefore submitted to a force, or more particularly to a torque relative to point O, counteracting its being driven by the driving hub 18.

Obviously, as a reaction, there is a torque corresponding to the above torque, which tends to drive in rotation the driven crown wheel 21, together with the intermediate crown wheel 24 in a way concordant with the rotation of the driving hub 18. A transmission of motion and torque occurs therefore between the first shaft 20 and second shaft 23.

The amount of the torque which in this way can be transmitted between the two shafts 20 and 23 is equal to half the torque applied by forces F and F' (FIG. 4) following the activation of actuator 35 and it increases in proportion to the increasing of the fluid pressure applied in the actuator itself.

The invention attains the intended purposes.

In fact the device of the invention combines all the advantages that can be individually found in the different types of known clutches or couplings without suffering the drawbacks proper to the latter.

More particularly, the inventive device is capable of transmitting high torques while having very reduced weight and bulkiness and enables shafts rotating at very high relative speeds to be dynamically connected without involving high losses of energy. In this connection it is to be noted that in the present device there are no members or elements the operation of which is strictly connected with a loss of energy such as for example in the case of clutch or oil discs in hydraulic couplings. The only losses in energy are produced by the rolling friction between the different elements performing a relative movement and are therefore of very little importance.

In addition, the concerned device offers both the possibility of entirely transmitting the torque and the rotatory motion between the two shafts and the possibility of establishing a maximum torque value transmitted between the shafts, beyond which value a relative rotation between said shafts occurs.

It will be appreciated that by suitably adjusting the activation of the actuator means it is possible to transmit movement to the driven shaft with more or less marked accelerations, depending upon requirements.

Also important is the fact that the device lends itself to be used as a torque distributor between two shafts connected to it. This particular use is very advantageous in the automotive field because, by associating suitable electronic detection apparatus with the inventive device, it is possible to distribute the torque between the front and rear axles of motor vehicles provided with four driving wheels instant by instant and in an optimal manner.

Obviously many modifications and variations may be made to the invention as conceived, all of them falling within the scope of the inventive idea characterizing it.

More particularly, the configuration of the path taken by the planetary gear elements must not necessarily be strictly elliptic; actually many other configurations can be taken as shown in the embodiments of FIGS. 8, 9 and 10.

What is claimed is:

1. A dynamic coupling device for transmitting in a first mode of operation a rotary motion between two shafts and in a second mode of operation disengaging said shafts, comprising:
    a driving hub coaxially and fixedly connected to one said shaft;
    a driven crown wheel fixedly connected to the other said shaft;
    an intermediate crown wheel connected to the driven crown wheel and capable of swinging about a predetermined axis;
    a number of planetary gear elements uniformly distributed about the axis of rotation of the driving hub, each of said gear elements being driven in rotation by the hub and guided, between the intermediate crown wheel and the driven crown wheel, according to a path subjecting said planetary gear elements to a reciprocating cyclic movement relative to the axis of rotation of the driving hub and to the axis of mutual swinging between the intermediate and the driven crown wheels;
    actuator means for changing operation between said modes by subjecting the intermediate and driven crown wheels to couples of forces tending to make said crown wheels rotate in opposite directions about their axes of mutual swinging, and consequently transmitting resultant forces to the planetary gear elements counteracting said planetary gear elements being driven by said hub.

2. The device as claimed in claim 1, wherein each said planetary gear element comprises a pivot guided between the driven crown wheel and the intermediate crown wheel and eccentrically fastened to a support stem rotatably engaged to the driving hub, whereby each said planetary gear element rotates about the axis of the support stem to change its own position relative to the axis of the driving hub when the planetary gear element is driven in rotation by the driving hub.

3. The device as claimed in claim 1, wherein said planetary gear elements (25) are slidably guided along a substantially elliptic slide track (26) lying in a plane substantially at right angles to the axis of the driving hub (18) and defined between a substantially elliptic guide ring (21a) belonging to the driven crown wheel (21) and a substantially elliptic guide cavity (24a) belonging to the intermediate crown wheel (24), said crown wheels (21, 24) being oscillatably engaged relative to each other according to an axis which is coincident with the axis of rotation of the hub (18).

4. The device as claimed in claim 3, wherein each planetary gear element (25) comprises a pivot (28) guided along an elliptic track (26) and eccentrically fastened to a support stem (29) rotatably engaged with the driving hub (18) according to an axis spaced apart from the axis of rotation of said hub (18) by an amount equal to one fourth of the sum between the major and minor axes (a, b) of an imaginary ellipse (26a) defined by the centre line of the elliptic track (26), said pivot (28) being off-centre relative to the support stem (29) by an amount equal to one fourth of the difference between the major and minor axes (a, b) of said imaginary ellipse (26a).

5. The device as claimed in claim 3, wherein each planetary gear element comprises at least two rollers (27) which are in contact in operation with said elliptic ring (21a) and elliptic cavity (24a) respectively, and are rotatably supported by a pivot (28) oscillatably engaged with the driving hub (18).

6. The device as claimed in claim 2, wherein a sprocket (29a) is fastened to the support stem (29) of each planetary gear element (25), said sprocket (29a) operatively engaging with an adjusting collar (30) mounted coaxially with the driving hub (18) and rotatably engaged therewith.

7. The device as claimed in claim 1, wherein said planetary gear elements (25) are provided in an even number being the multiple of an odd number.

8. The device as claimed in claim 1, wherein said actuator means (31) comprises an operating collar (32) axially movable upon command of a fluid-operated actuator (35) and slidably engaged between a connecting shank (33) extending from the driven crown wheel (21) and a connecting sleeve (34) projecting from the intermediate crown wheel (24), said operating collar (32) being provided with helical teeth (32a) operatively matching with helical teeth (33a) offered by the connecting shank (33), as well as with radial extensions (32b) slidably engaging into respective grooves (34a) axially formed in the connecting sleeve (34).

9. The device as claimed in claim 8, wherein said fluid-operated actuator (35) comprises an inner annular element (36) fixedly fastened to the operating collar (32) and an outer annular element (38) rotatably engaged with the inner annular element (36) and sealingly and slidably housed in a holding structure (17), said outer annular element (38) being provided with at least a diametrical shoulder (38a) sealingly and slidably engaged within an annular chamber (39) defined in said holding structure (17) and receiving two feed nozzles (40) coming from opposite sides relative to the diametrical shoulder (38a), through said feed nozzles (40) a working fluid under pressure being selectively sent to said annular chamber (39).

10. The device as claimed in claim 1, wherein each planetary gear element (8) is eccentrically mounted on a gear wheel (9) rotatably connected to the driving hub (4) and operatively engaging with a ring gear (10) offered by said intermediate crown wheel (7), said planetary gear element (8) being disposed according to an axis parallelly offset relative to the axis of rotation of the gear wheel (9) and operating in a contact relationship on a guide surface (6a) exhibited by the driven crown wheel (6) and extending parallelly to the path described by the axis of the planetary gear element (8) when the gear wheel (9) is rolling along the ring gear (10).

11. The device as claimed in claim 10, wherein said gear wheel (9) is operatively engaged inside the ring gear (10), the latter extending according to a circumference concentric with the axis of the driving hub (4) and having a diameter which is twice the diameter of the gear wheel (9), said guide surface (6a) having a substantially elliptic configuration.

12. The device as claimed in claim 10, wherein said gear wheel (9) is operatively engaged outside the ring gear (10), the latter extending concentrically with the axis of the driving hub (4) and having a diameter which is twice the diameter of the gear wheel (9), said guide surface (11) being in the form of a double epicycloid symmetrically disposed relative to the ring gear (10).

13. The device as claimed in claim 10, wherein said gear wheel (9) is operatively engaged inside the ring gear (10), the latter extending concentrically with the axis of the driving hub (4) and having a diameter which is three times the diameter of the gear wheel (9), said guide surface (11) being substantially in the form of a triangle with arched sides.

14. The device as claimed in claim 10, wherein said gear wheel (9) is operatively engaged outside the ring gear (10), the latter extending concentrically with the axis of the driving hub (4) and having a diameter equal to that of the gear wheel (9), said guide surface (11) being substantially in the form of a cardioid.

15. The device as claimed in claim 10, wherein the diameter value of the gear wheel (9) is a submultiple of the diameter value of the ring gear (10), said guide surface (11) being substantially shaped as a plurality of cycloid portions the number of which is equal to the ratio between the diameters of the ring gear (10) and gear wheel (9).

16. The device as claimed in claim 1, wherein said actuator means (12) comprises a collar (13) rotatably locked relative to the driven crown wheel (6) and axially movable relative to the same, which collar (13) is provided with a helical toothing (13a) operatively engaging with a helical toothing (14a) offered by a block (14) integral with the intermediate crown wheel (7).

17. A dynamic coupling device for transmitting in a first mode of operation a rotary motion between two shafts and in a second mode of operation disengaging said shafts, comprising:

a driving hub coaxially and fixedly connected to one said shaft;

a driven crown wheel fixedly connected to the other said shaft;

an intermediate crown wheel connected to the driven crown wheel and capable of swinging about a predetermined axis;

a number of planetary gear elements uniformly positioned about the axis of rotation of the driving hub, each of said gear elements being driven in rotation by the hub and being constrained between the intermediate crown wheel and the driven crown wheel to follow a path subjecting said planetary gear elements to a reciprocating cyclic movement relative to the axis of rotation of the driving hub and relative to the axis of mutual swinging between the intermediate and the driven crown wheels;

actuator means for changing operation between said modes by subjecting the intermediate and driven crown wheels to couples of forces tending to make said crown wheels rotate in opposite directions about their axes of mutual swinging.

* * * * *